US007744515B2

(12) United States Patent
Iwamura et al.

(10) Patent No.: US 7,744,515 B2
(45) Date of Patent: Jun. 29, 2010

(54) CONDUCTIVE ROLLER AND INSPECTION METHOD THEREFOR

(75) Inventors: Makoto Iwamura, Yokohama (JP); Naoki Hirakawa, Yokohama (JP); Masashi Yamazaki, Yokohama (JP); Hitoshi Shirasaka, Yokohama (JP)

(73) Assignee: Synztec Co., Ltd., Tokyo (JP)

( * ) Notice: Subject to any disclaimer, the term of this patent is extended or adjusted under 35 U.S.C. 154(b) by 1217 days.

(21) Appl. No.: 11/318,546

(22) Filed: Dec. 28, 2005

(65) Prior Publication Data

US 2006/0142131 A1 Jun. 29, 2006

(30) Foreign Application Priority Data

Dec. 28, 2004 (JP) ............................. 2004-381374
Dec. 20, 2005 (JP) ............................. 2005-367177

(51) Int. Cl.
*F16C 13/00* (2006.01)
*B21K 1/02* (2006.01)

(52) U.S. Cl. ............................... 492/56; 492/9; 492/11; 492/53; 399/176; 29/895.3; 29/895.32; 29/895

(58) Field of Classification Search ..................... 492/9, 492/11, 56, 53; 399/176; 29/895.3, 895.32, 29/895
See application file for complete search history.

(56) References Cited

U.S. PATENT DOCUMENTS

| | | | | |
|---|---|---|---|---|
| 5,240,799 | A * | 8/1993 | Kovacs et al. | 430/41 |
| 5,659,854 | A * | 8/1997 | Masuda et al. | 399/176 |
| 5,863,626 | A * | 1/1999 | Yamasaki | 428/36.5 |
| 6,013,690 | A * | 1/2000 | Coleman et al. | 521/128 |
| 6,134,416 | A * | 10/2000 | Tamiya | 399/313 |
| 6,384,171 | B1 * | 5/2002 | Yamazaki et al. | 528/15 |
| 7,070,552 | B2 * | 7/2006 | Mizumoto | 492/56 |
| 7,172,543 | B2 * | 2/2007 | Uesaka et al. | 492/56 |
| 7,544,158 | B2 * | 6/2009 | Yamada et al. | 492/56 |
| 2005/0029693 | A1 * | 2/2005 | Noda et al. | 264/46.9 |
| 2005/0227089 | A1 * | 10/2005 | Hirakawa et al. | 428/423.1 |
| 2006/0252619 | A1 * | 11/2006 | Yamada et al. | 492/56 |
| 2006/0252620 | A1 * | 11/2006 | Urano et al. | 492/56 |
| 2007/0230975 | A1 * | 10/2007 | Yamazaki et al. | 399/31 |

FOREIGN PATENT DOCUMENTS

| | | | | |
|---|---|---|---|---|
| JP | 63187268 | A | * | 8/1988 |
| JP | 05100551 | A | * | 4/1993 |
| JP | 2003-202750 | A | | 7/2003 |
| JP | 2006207807 | A | * | 8/2006 |
| JP | 2008293046 | A | * | 12/2008 |

* cited by examiner

*Primary Examiner*—Essama Omgba
(74) *Attorney, Agent, or Firm*—Sughrue Mion, PLLC

(57) ABSTRACT

A conductive roller which can form images of consistent quality and does not cause image failures such as formation of blank spots and a method for inspecting the roller. The conductive roller having a metallic core and at least one rubber elastic layer provided on the outer peripheral surface of the core, the rubber elastic layer being formed from a conductive rubber to which conductivity has been imparted by carbon powder, wherein the conductive roller satisfies the relationship represented by formula (1):

$$Zr/Zc \geqq 5 \quad (1),$$

wherein Zr (Ω) represents a resistance component and Zc (Ω) represents a capacitive reactance component, the resistance component Zr (Ω) and the capacitive reactance component Zc (Ω) being calculated respectively from impedance Z (Ω) and phase difference θ, when the impedance Z (Ω) is measured upon application of an AC voltage of 0.2 V at a frequency of 1 Hz to the rubber elastic layer.

13 Claims, 13 Drawing Sheets

CONDUCTIVE ROLLER AND INSPECTION METHOD THEREFOR

BACKGROUND OF THE INVENTION

1. Field of the Invention

The present invention relates to a conductive roller for use in an image-forming apparatus such as an electrophotographic copying machine or a printer, and to a method for inspecting the roller. More particularly, the invention relates to a conductive roller suitable for a development roller and to an inspection method therefor.

2. Background Art

Conventionally, a development roller for use in an image-forming apparatus is formed of a polyurethane material to which an ion-conducting agent such as lithium perchlorate has been added.

Such a development roller containing an ion-conducting agent has a drawback in that electric resistance of the roller varies considerably in accordance with variation in use conditions. Specifically, under low temperature and low humidity conditions, resistance value increases, resulting in insufficient charging of a toner, and under high temperature and high humidity conditions, resistance value decreases, resulting in fogging of a toner, Needless to say, both cases result in image failure.

Meanwhile, there has been investigated a development roller to which electrical conductivity has been imparted by use of carbon black. Such a development roller exhibits comparatively small environmental dependency, but large charge in electrical resistance in accordance with applied voltage, which is problematic. In addition, variation in electric resistance value makes it difficult to control electrical resistance to a predetermined value, which is also problematic.

Under the foregoing circumstances, a development roller which can be used with consistent performance was previously proposed. Specifically, Japanese Patent Laid-Open (kokai) No. 2003-202750 (in claims and other sections) discloses the development roller to which electrical conductivity has been imparted by use of carbon black, in which variation in electrical resistance is minimized to obtain a predetermined resistance value.

However, the present inventors have found that image quality of actually obtained printed products cannot be predicted on the sole basis of variation in electrical resistance. In other words, even under the same variation conditions in electrical resistance, quality of obtained images may vary.

SUMMARY OF THE INVENTION

Under the aforementioned circumstances, an object of the present invention is to provide a conductive roller which can form images of consistent quality and does not cause image failures such as formation of blank spots. Another object of the present invention is to provide a method for inspecting the roller.

The present invention has been accomplished on the basis of a finding that the actual dispersion state cannot be evaluated by conventionally employed electrical resistance but can be evaluated on the basis of impedance. This finding has been obtained from the observation that in a conductive roller having a rubber elastic layer to which conductivity has been imparted by carbon powder, better dispersion state provides more excellent image characteristics and other characteristics.

In other words, the inventors have found the following. Through careful observation of the dispersion state of carbon powder, there can be observed an area of a rubber layer including no carbon, which area has been formed by local aggregation of carbon powder caused by a slightly poor dispersion state. Electrical resistance of the rubber layer is virtually insensitive to the presence or absence of the carbon-deficient area, but variations arise in the relationship between the resistance component of impedance and the capacitive reactance component. The present invention has been accomplished on the basis of this finding.

Accordingly, in a first aspect of the present invention, there is provided a conductive roller comprising a metallic core and at least one rubber elastic layer provided on the outer peripheral surface of the core, the rubber elastic layer being formed from a conductive rubber to which conductivity has been imparted by carbon powder, wherein the conductive roller satisfies the relationship represented by formula (1):

$$Zr/Zc \geqq 5 \qquad (1),$$

wherein Zr (Ω) represents a resistance component calculated from impedance Z (Ω) and phase difference θ, and Zc (Ω) represents a capacitive reactance component, as measured upon application of an AC voltage of 0.2 V at a frequency of 1 Hz.

In the conductive roller, the relationship between resistance component Zr (Ω) calculated from impedance Z (Ω) and phase difference θ, and capacitive reactance Zc (Ω), as measured upon application of an AC voltage of 0.2 V at a frequency of 1 Hz and under any of L/L conditions (10° C., 30% RH), N/N conditions (25° C., 50% RH), and H/H conditions (35° C., 85% RH), may satisfy formula (1).

In the conductive roller, the rubber elastic layer may be formed of a polyurethane rubber having conductivity, and the polyurethane may be an ether-based polyurethane.

In the above conductive roller, the rubber elastic layer may have, on a surface thereof, a surface-treated layer which has been formed through treating the surface with a surface-treatment liquid containing an isocyanate, and, after removal of the surface-treated layer, the relationship between resistance component Zr (Ω) calculated from impedance Z (Ω) and phase difference θ, and capacitive reactance Zc (Ω), as measured upon application of an AC voltage of 0.2 V at a frequency of 1 Hz to the rubber elastic layer, may satisfy formula (2):

$$25 \geqq Zr/Zc \geqq 5 \qquad (2).$$

In the above conductive roller, the relationship between resistance component Zr (Ω) calculated from impedance Z (Ω) and phase difference θ, and capacitive reactance Zc (Ω), as measured upon application of an AC voltage of 0.2 V at a frequency of 1 Hz to the rubber elastic layer having the surface-treated layer, may satisfy formula (2).

The surface treatment liquid may further contain carbon black, and/or at least one polymer species selected from among an acrylic fluoropolymer and an acrylic silicone polymer.

In a second aspect of the present invention, there is provided a method for inspecting a conductive roller having a metallic core and at least one rubber elastic layer provided on the outer peripheral surface of the core, the rubber elastic layer being formed from a conductive rubber to which conductivity has been imparted by carbon powder, wherein the method comprises determining whether or not the relationship between resistance component Zr (Ω) calculated from impedance Z (Ω) and phase difference θ, and capacitive reactance Zc (Ω), as measured upon application of an AC voltage of 0.2 V at a frequency of 1 Hz, satisfies formula (1):

$$Zr/Zc \geqq 5 \quad (1).$$

In the above method, a determination may be made as to whether or not the relationship between resistance component Zr (Ω) calculated from impedance Z (Ω) and phase difference θ, and capacitive reactance Zc (Ω), as measured upon application of an AC voltage of 0.2 V at a frequency of 1 Hz and under any of L/L conditions (10° C., 30% RH), N/N conditions (25° C., 50% RH), and H/H conditions (35° C., 85% RH), satisfies formula (1).

In the above method, the rubber elastic layer may be formed of a polyurethane rubber having conductivity and formed of an ether-based polyurethane, and may have, on a surface thereof, a surface-treated layer which has been formed through treating the surface with a surface-treatment liquid containing an isocyanate, and, after removal of the surface-treated layer, a determination is made as to whether or not the relationship between resistance component Zr (Ω) calculated from impedance Z (Ω) and phase difference θ, and capacitive reactance Zc (Ω), as measured upon application of an AC voltage of 0.2 V at a frequency of 1 Hz to the rubber elastic layer, satisfies formula (2):

$$25 \geqq Zr/Zc \geqq 5 \quad (2).$$

In the above method, a determination may be made as to whether or not the relationship between resistance component Zr (Ω) calculated from impedance Z (Ω) and phase difference θ, and capacitive reactance Zc (Ω), as measured upon application of an AC voltage of 0.2 V at a frequency of 1 Hz to the rubber elastic layer having the surface-treated layer satisfies formula (2).

In the above method, the surface treatment liquid may further contain carbon black, and/or at lease one polymer species selected from among an acrylic fluoropolymer and an acrylic silicone polymer.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The conductive roller of the present invention has a conductive rubber elastic layer having a relationship between resistance component Zr (Ω) calculated from impedance Z (Ω) and phase difference θ, and capacitive reactance Zc (Ω); as measured upon application of an AC voltage of 0.2 V at a frequency of 1 Hz, of $Zr/Zc \geqq 5$, preferably $Zr/Zc \geqq 10$. So long as the conductive layer has such a conductive rubber elastic layer, the layer structure may be single or double. The conductor roller may have a protective layer or a high-resistance layer, which is provided on a surface of the rubber elastic layer, for the purpose of prevention of staining, leakage, etc. Such a conductor roller also falls within the scope of the present invention, so long as the rubber layer thereunder satisfies the aforementioned conditions. Although detailed descriptions will be provided later, needless to say, when the rubber elastic layer is formed of polyurethane and has on a surface thereof a surface-treated layer formed through surface treatment by use of a surface treatment liquid containing an isocyanate, the rubber elastic layer after removal of the surface-treated layer satisfies the aforementioned conditions. In this case, the rubber elastic layer having the surface-treated layer per se preferably has a relationship between resistance component Zr (Ω) calculated from impedance Z (Ω) and phase difference θ, and capacitive reactance Zc (Ω), as measured upon application of an AC voltage of 0.2 V at a frequency of 1 Hz, of $Zr/Zc \geqq 5$.

Meanwhile, re-aggregation of carbon which has been dispersed in the resin during molding is not preferred. In the re-aggregated state, Zr/Zc is prone to increase excessively. On the basis of this fact, it has been found that the rubber elastic layer before provision of the surface-treated layer or the rubber elastic layer having the surface-treated layer after removal of the surface-treated layer preferably satisfies the condition $25 \geqq Zr/Zc$. Specifically, a rubber elastic layer which does not satisfy the condition $25 \geqq Zr/Zc$ before provision of the surface-treated layer but which satisfies the condition $25 \geqq Zr/Zc$ after provision of the surface-treated layer has been found to be an undesirable layer, since re-aggregation of carbon may occur in the layer. Needless to say, a rubber elastic layer which fails to satisfy the condition $25 \geqq Zr/Zc$ both before and after provision of the surface-treated layer is an undesirable layer.

Figure 1A:
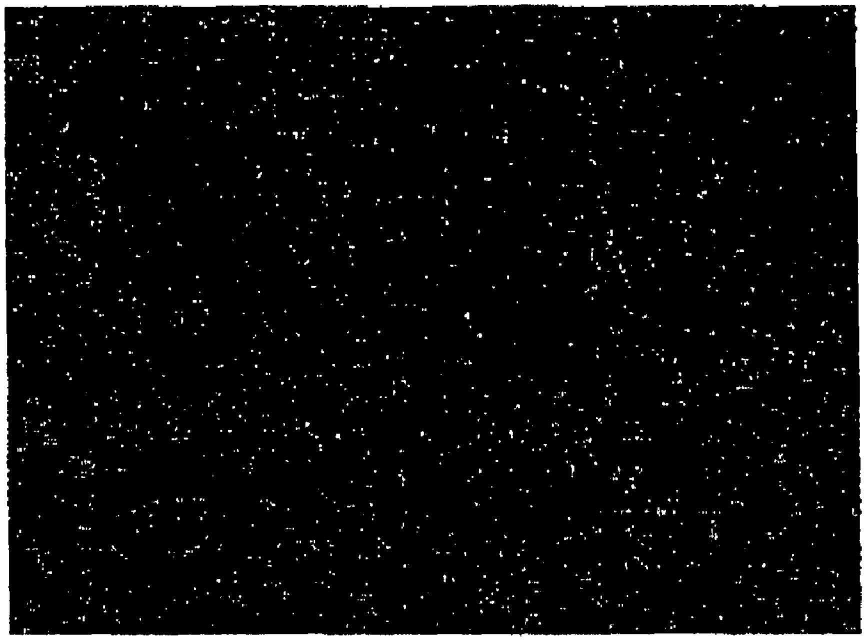
FIGS. 1A and 1B are photographs showing dispersion of carbon as captured under a microscope.
Figure 1B:
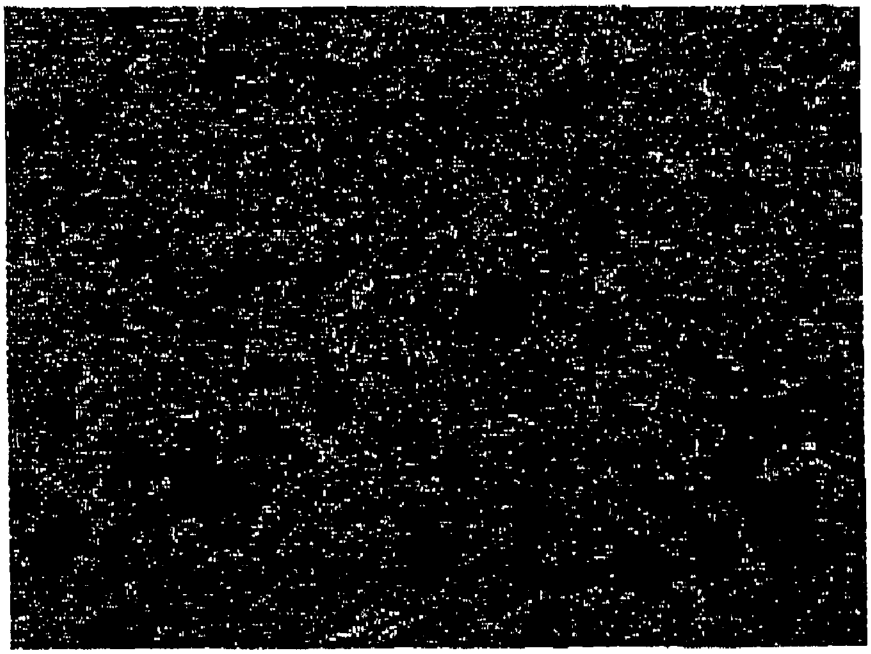
Figure 2:
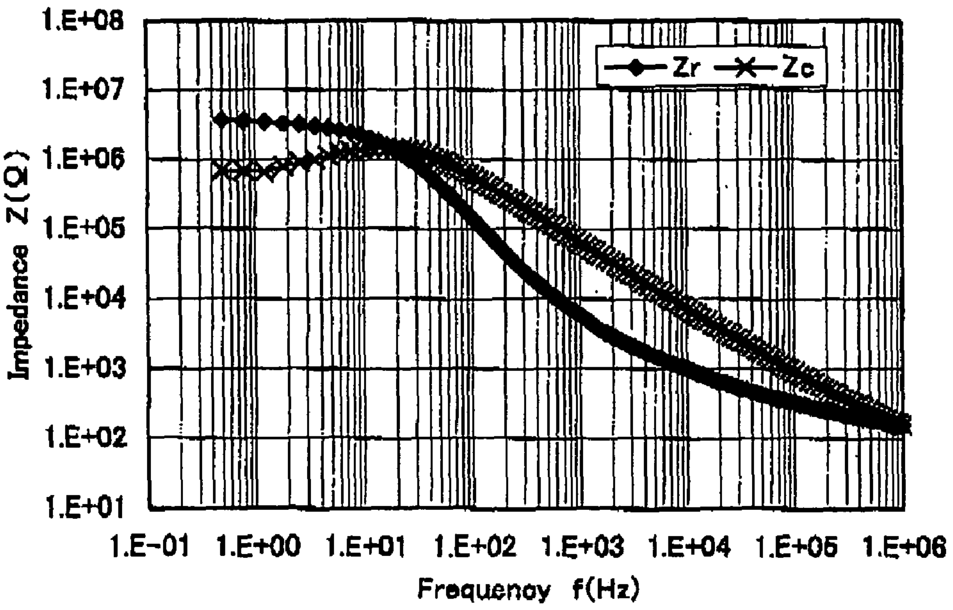
FIG. 2 is a graph showing frequency characteristics obtained in Example 1.
Figure 3:
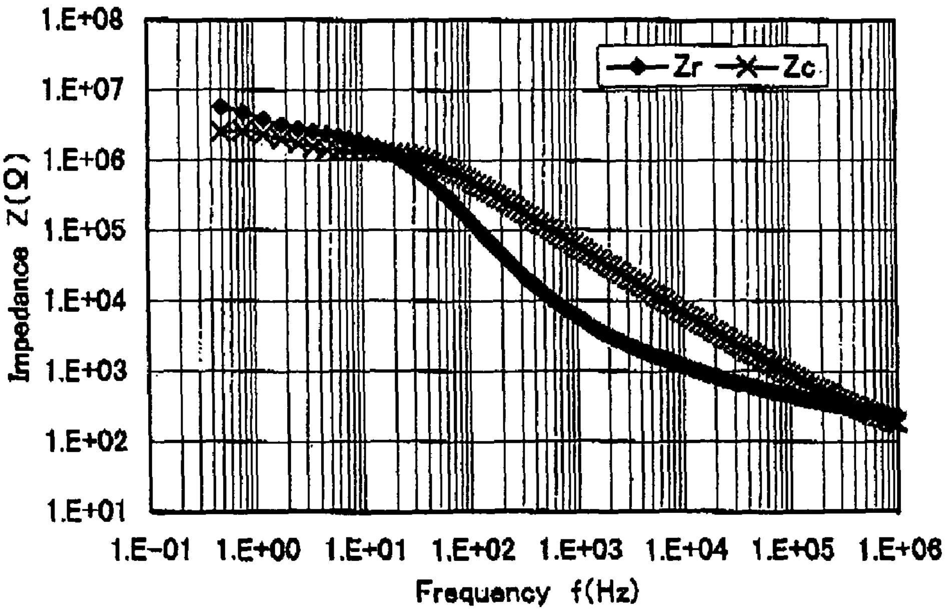
FIG. 3 is a graph showing frequency characteristics obtained in Comparative Example 1.
Figure 4:
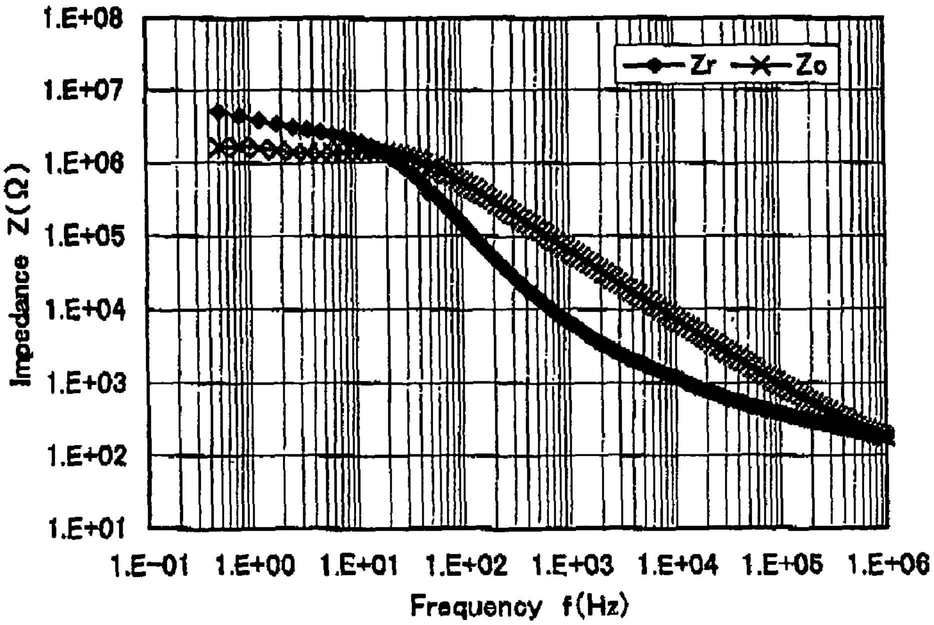
FIG. 4 is a graph showing frequency characteristics obtained in Comparative Example 2.
Figure 5:
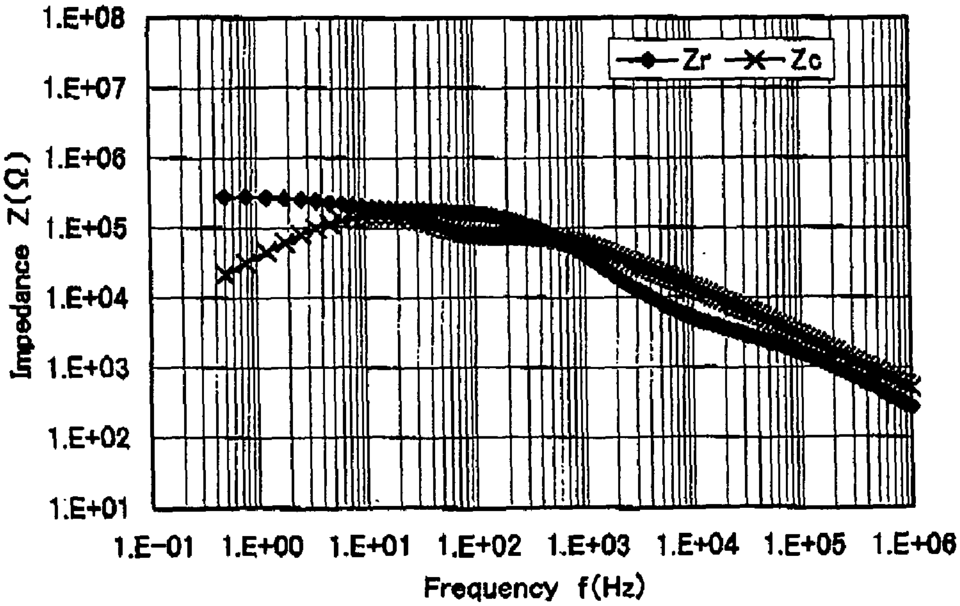
FIG. 5 is a graph showing frequency characteristics obtained in Example 5.
Figure 6:
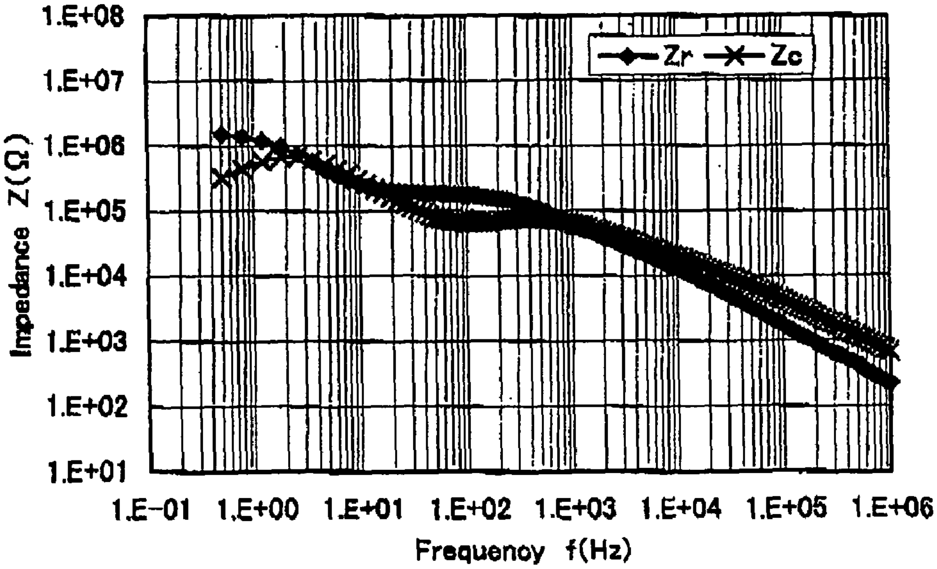
FIG. 6 is a graph showing frequency characteristics obtained in Comparative Example 4.
Figure 7:
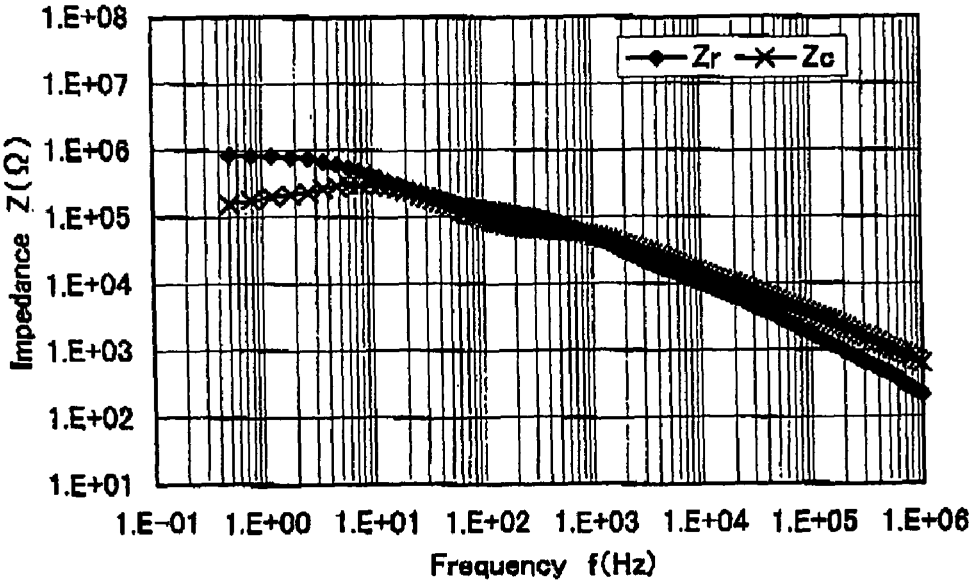
FIG. 7 is a graph showing frequency characteristics obtained in Comparative Example 5.

Each of FIGS. 1A and 1B is a photograph of a cross-section of a rubber elastic layer of a conductive roller containing carbon powder (or microparticles). FIG. 1A shows a cross-section in which carbon particles are well dispersed, whereas FIG. 1B shows a cross-section in which carbon particles are not sufficiently dispersed. In FIG. 1B, an area assuming black corresponds to a rubber portion from which carbon powder have been removed. The equivalent circuit of such a rubber elastic layer can be represented by parallel circuits of a resistance component and a capacitive reactance component, the resistance component being attributable to a carbon network forming conductive paths and the reactance component being attributable to a carbon network failing to form conductive paths due to aggregation during molding under poor heat and dispersion conditions. In the case where the dispersion condition is impaired, a rubber portion containing no carbon increases, and the amount of carbon network forming conductive paths decreases. In contract, the amount of carbon network not forming conductive paths increases, thereby reducing the resistance component and elevating the capacitive reactance component Zc. Therefore, the condition of $Zr/Zc \geqq 5$ is conceived to fail to be maintained.

In the production of the conductive roller of the present invention, dispersion of carbon powder is preferably enhanced to as high a degree as possible. No particular limitation is imposed on the dispersion method, but when the below-mentioned production method is employed, a rubber elastic layer having high dispersibility and satisfying the aforementioned impedance conditions can be readily produced. Notably, even when the method is employed, the aforementioned conditions are not always satisfied, due to a certain degree of variation.

Therefore, the inspection method of the present invention has been accomplished from the aforementioned viewpoint. Accordingly, the method of the present invention for inspecting a conductive roller includes determining whether or not the relationship between resistance component Zr (Ω) calculated from impedance Z (Ω) and phase difference θ, and capacitive reactance Zc (Ω), as measured upon application of an AC voltage of 0.2 V at a frequency of 1 Hz, satisfies formula (1):

$$Zr/Zc \geqq 5 \quad (1).$$

In the case where a surface-treated layer is provided, the method includes determining whether or not the rubber elastic layer, before provision of the surface-treated layer or after removal of the provided surface-treated layer, has a relationship between resistance component Zr (Ω) calculated from impedance Z (Ω) and phase difference θ, and capacitive reactance Zc (Ω), as measured upon application of an AC voltage of 0.2 V at a frequency of 1 Hz to the rubber elastic layer which relationship satisfies formula (2):

$$25 \geqq Zr/Zc \geqq 5 \quad (2).$$

Through employment of the inspection method, the degree of dispersion of carbon powder can be determined without checking image characteristics. Thus, final failure roller products can be remarkably reduced.

The method for producing a conductive roller suitable for dispersing carbon powder at comparatively high dispersion degree will be described. In the method for producing a conductive roller including forming on a metallic core a conductive elastic layer formed of a thermosetting elastomer and carbon powder dispersed in the elastomer, a low-thermal-conductivity tube is provided on a molding surface of a mold for molding the conductive elastic layer, the tube having a thermal conductivity one tenth or even lower that of the mold. Preferably, the low-thermal-conductivity tube is employed as a molding member instead of the mold. The conductive elastic layer is molded with heating in an electric furnace or a similar heater. Preferably, the low-thermal-conductivity tube is made of a resin and has a thickness of 0.05 to 1.00 mm. More preferably, the tube has a thermal conductivity of 0.1 W/m·K to 5 W/m·K.

However, in the present invention, no particular limitation is imposed on the method for producing a conductive roller, and a conventional heat molding method employing a mold may also be employed so long as a certain level of dispersibility of carbon powder is ensured. For example, hardening may be performed under precise control of mold temperature. Alternatively, a surface layer of the conductive elastic layer of the conductive roller, in which aggregation carbon particles has been caused by a large temperature difference between the surface and the inside, may be cut out until a surface where carbon powder are well dispersed appears.

The inspection method of the present invention can be applied to conductive rollers which have been produced through any production methods. When the inspection method is applied to a conductive roller which has been produced through a production method that readily causes variation in dispersibility of carbon powder, percent failure of final roller products can be remarkably reduced.

In the conductive roller of the present invention, carbon powder are particles of at least one carbon black predominantly containing conductive carbon black. Needless to say, a plurality of carbon black species may be used in combination. In this case, generally, the mixture predominantly contains a conductive carbon black.

The amount of carbon black added to the resin varies in accordance with the target electrical resistivity. For example, in the case of ether-based polyurethane, carbon black is preferably added in an amount of 8 parts by weight or less to 100 parts by weight of ether-based polyol. When carbon black is added more than 8 parts by weight, molding becomes difficult.

No particular limitation is imposed on the rubber material for forming the rubber elastic body employed in the present invention, and the material may be selected in accordance with use. In the case of a development roller, polyurethane is preferred from the viewpoint of staining of photoconductor and rubber characteristics, with ether-based polyurethane being particularly preferred. In addition, polyurethane is advantageous, since the below-described surface-treated layer can be provided by use of a surface treatment liquid containing an isocyanate.

The conductive roller of the present invention may be covered with a resin tube or the like serving as a protective layer or a high-resistance layer. Alternatively, a surface-treated layer may be provided on a surface of the rubber elastic layer through surface treatment by use of a surface treatment liquid containing an isocyanate. The thus-formed surface-treated layer is advantageous, since the layer imparts a stain-prevention property to the roller without greatly varying electrical resistance, as compared with the aforementioned resin tube. In other words, through provision of such a surface-treated layer, a graded resistance layer is formed. In the graded resistance layer, carbon black particles are gradually broken in a direction from the interface with the surface-treated layer to the inside thereof, and electrical resistance gradually decreases toward the inside. The structure is advantageous, since an electrical resistance of interest can be obtained through appropriately modifying the amount of carbon black and the graded resistance layer.

Preferably, the conductive roller of the present invention contains carbon powder which provides conductivity, but does not contain an ion conducting agent, since environmental dependency in electrical resistance is remarkably minimized. Notably, electrical resistance of a conductive roller varies in accordance with applied voltage. The electrical resistance values upon application of 5V, 50V, and 100V, represented by $Rv_5$, $Rv_{50}$, and $Rv_{100}$, respectively, preferably fall within a range of $5\times10^5$ to $5\times10^8$ Ω.

The aforementioned ether-based polyurethane, which is suitable for a matrix of the rubber elastic body employed in the present invention, can be produced through reaction between a polyisocyanate and a polyol predominantly containing an ether-based polyol. The thus-formed polyurethane is a cast-type polyurethane exhibiting small compressive permanent strain. In contrast, a similar ether-based polyurethane of a millable type, compressive permanent strain cannot be reduced sufficiently. An ester-based polyurethane is highly susceptible to hydrolysis, and thus cannot be reliably used for a long period of time.

The rubber elastic layer of the conductive roller of the present invention preferably has a compressive permanent strain (JIS K6262) of 3% or less. When the compressive permanent strain is higher than 3%, variation in charge amount occurs.

Examples of the diisocyanate to be reacted with polyether diol include 2,4-toluene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4'-diisocyanate (TODI), modified prepolymers having these diisocyates at both ends, and oligomers thereof.

As mentioned above, the top surface of the elastic body must be treated through isocyanate treatment including impregnation of the elastic body with an isocyanate compound and curing. The employable surface treatment liquid in the treatment may be a solution of an isocyanate compound in an organic solvent, or the solution further containing carbon black. Alternatively, a solution of an isocyanate compound in an organic solvent to which at least one polymer selected from an acrylic fluoropolymer and an acrylic silicone polymer, and the solution further containing a conductivity-imparting agent may also be employed.

Examples of the isocyanate compound include 2,6-toluene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4'-diisocyanate (TODI), and the aforementioned oligomers and modified prepolymers.

The conductive roller of the present invention is particularly suitable for a development roller. In order to reliably serve as a development roller, the roller preferably as a surface roughness Rz, as determined in the circumferential direction, of 8 μm or less.

EXAMPLES

The present invention will next be described in detail by way of examples, which should not be construed as limiting the invention thereto. Unless otherwise specified, the unit "part(s)" is weight basis.

Example 1

<Production of Roller>

Toka Black #5500 (product of Tokai Carbon Co., Ltd.) (5 parts) was added to polyether polyol (GP-3000, product of Sanyo Chemical Industries, Ltd.) (100 parts), and carbon particles were dispersed to a particle size of about 10 μm or less, followed by maintaining at 60° C., to thereby prepare liquid A. Separately, Coronate C-HX (product of Nippon Polyurethane Industry Co., Ltd.) (11 parts) was added to a prepolymer (Adiprene L100, product of Uniroyal) (25 parts), and the mixture was maintained at 60° C., to thereby prepare liquid B. Liquids A and B were mixed, and the mixture was injected into a polypropylene extruded tube (outer diameter: 24 mm, thickness: 0.3 mm), where a shaft (ϕ: 8 mm, l: 270 mm) had been placed in advance at the center, with both end portions of the shaft being fixed by means of polypropylene resin caps. The tube was heated for 120 minutes in an oven maintained at 110° C., to thereby form a conductive polyurethane layer on the surface of the shaft other than the end portions. The carbon black content was found to be 3.5 wt. %.

The surface of the conductive roller was polished in an amount of 1.5 mm, to thereby adjust the outer diameter to 20 mm. The roller was employed as a conductive roller of Example 1.

Example 2

The procedure of Example 1 was repeated, except that the thickness of the polypropylene extruded tube was altered to 0.2 mm, to thereby produce a conductive roller of Example 2.

Example 3

The procedure of Example 1 was repeated, except that the heating temperature was altered to 130° C., to thereby produce a conductive roller of Example 3.

Example 4

The procedure of Example 2 was repeated, except that the heating temperature was altered to 130° C., to thereby produce a conductive roller of Example 4.

Example 5

Ethyl acetate (100 parts), acetylene black (product of Denki Kagaku Kogyo K.K.) (3 parts), and an acrylic fluoropolymer (Novafusso, product of Dai Nippon Shikizai Kogyo Co., Ltd.) (2 parts) were mixed for dispersing components by means of a ball mill for three hours, and an isocyanate compound (MDI) (20 parts) was added to the dispersion, followed by mixing for dissolution, to thereby prepare a surface treatment liquid. The conductive roller of Example 1 was surface-treated with the surface treatment liquid, to thereby form a surface-treated layer. Specifically, a roller having a rubber surface was immersed for 10 seconds in the surface treatment liquid maintained at 23° C., and the thus-treated roller was heated in an oven maintained at 120° C. for one hour, to thereby form a surface-treated layer. The roller was employed as a conductive roller of Example 5.

Example 6

The surface of the conductive roller of Example 2 was treated in a manner similar to that of Example 5, to thereby produce a conductive roller of Example 6.

Example 7

The surface of the conductive roller of Example 3 was treated in a manner similar to that of Example 5, to thereby produce a conductive roller of Example 7.

Example 8

The surface of the conductive roller of Example 4 was treated in a manner similar to that of Example 5, to thereby produce a conductive roller of Example 8.

Comparative Example 1

The procedure of Example 1 was repeated, except that the mixture of liquids A and B was molded by use of an iron pipe mold which had a release layer formed through coating of a silicone-based releasing agent and which had been preliminary heated at 110° C., to thereby produce a conductive roller. The surface of the conductive roller was polished in an amount of about 1.5 mm, to thereby adjust the outer diameter to 20 mm. The roller was employed as a conductive roller of Comparative Example 1.

Comparative Example 2

The procedure of Comparative Example 1 was repeated, except that a polypropylene extruded tube (outer diameter: 23 mm, thickness: 0.3 mm) was inserted into the iron pipe mold such that the tube was tightly bonded to the inner surface of the mold, to thereby produce a conductive roller of Comparative Example 2.

Comparative Example 3

The procedure of Comparative Example 1 was repeated, except that the heating temperature was altered to 130° C., to thereby produce a conductive roller of Comparative Example 3.

Comparative Example 4

The surface of the conductive roller of Comparative Example 1 was treated in a manner similar to that of Example 5, to thereby produce a conductive roller of Comparative Example 4.

Comparative Example 5

The surface of the conductive roller of Comparative Example 2 was treated in a manner similar to that of Example 5, to thereby produce a conductive roller of Comparative Example 5.

Comparative Example 6

The surface of the conductive roller of Comparative Example 3 was treated in a manner similar to that of Example 5, to thereby produce a conductive roller of Comparative Example 6.

Comparative Example 7

The procedure of Comparative Example 1 was repeated, except that lithium perchlorate (0.1 parts) serving as a conducting agent was added, and the same treatment as carried out in Example 5 was performed, to thereby produce a conductive roller of Comparative Example 7.

Test Example 1

<Impedance Measurement>

Impedance characteristics of the conductive rollers produced in the Examples and the Comparative Examples (except for Comparative Example 7) were determined by means of an impedance analyzer (IMPEDANCE ANALYZER IM6e, product of BHA). Impedance was measured under N/N conditions (25° C., 50% RH), while a load of 500 g was applied to each end portion of each roller and voltage of 0.2 V was applied to the roller. Resistance component Zr (Ω) was calculated from impedance Z (Ω) and phase difference θ at an AC frequency of 1 Hz, and the ratio (Zr/Zc) of resistance component to capacitive reactance component Zc (Ω) was obtained.

Table 1 shows the results of the rollers of Examples 1 to 4 and Comparative Examples 1 to 3. Table 2 shows the results of the rollers having a surface-treated layer of Examples 5 to 8 and Comparative Examples 4 to 6. FIGS. 2 to 7 show frequency characteristics of the conductive rollers of Examples 1 and 5 and Comparative Examples 1, 2, 4, and 5.

Test Example 2

<Image Evaluation>

Each of the conductive rollers of Examples 5 to 8 and Comparative Examples 4 to 7 was installed as a development roller in a commercial printer. The images obtained under L/L conditions (10° C., 30% RH), N/N conditions (25° C., 50% RH), and H/H conditions (35° C., 85% RH) were evaluated. The results are also shown in Table 2.

Test Example 3

<Microscopic Observation of Cross-Section of Roller>

Figure 8:
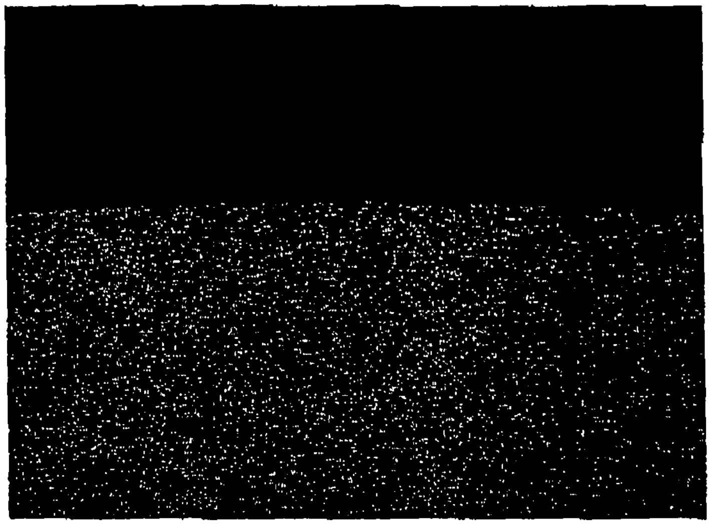
FIG. 8 is a photograph captured under a microscope showing a cross-section of a conductive roller of Example 5.
Figure 9:
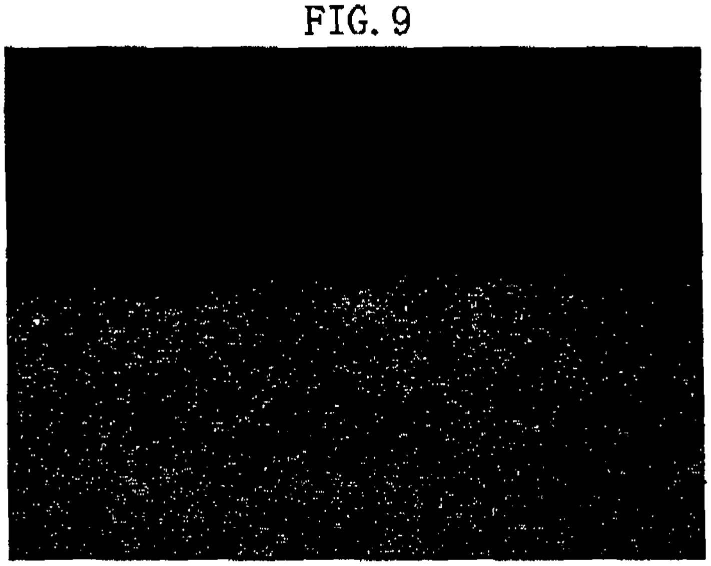
FIG. 9 is a photograph captured under a microscope showing a cross-section of a conductive roller of Comparative Example 4.
Figure 10:
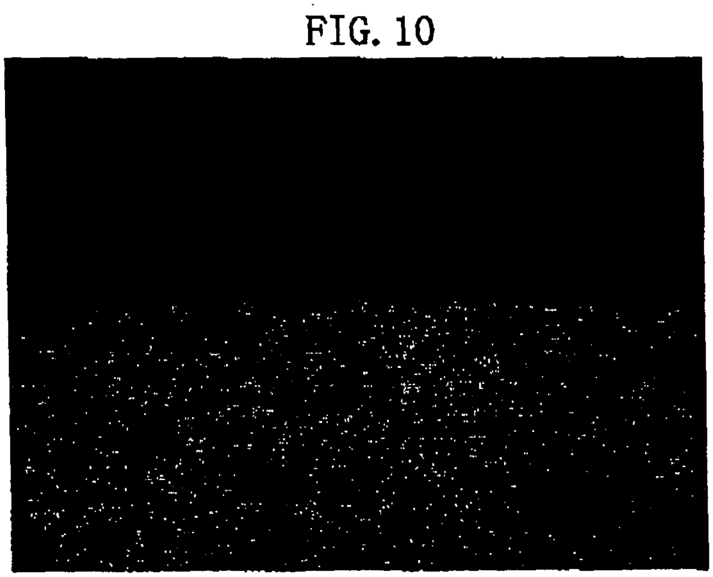
FIG. 10 is a photograph captured under a microscope showing a cross-section of a conductive roller of Comparative Example 5.

A cross-section of each of the conductive rollers of the Examples and the Comparative Examples serving as development rollers was observed under a laser microscope (VK-9500, product of KEYENCE), and dispersion of carbon particles was evaluated. The results are also shown in Table 2. FIGS. 8 to 10 are photographs captured under a microscope showing cross-sections of conductive rollers of Example 5 and Comparative Examples 4 and 5, respectively.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Zr/Zc | 5.25 | 5.17 | 5.17 | 5.59 | 1.61 | 2.43 | 2.13 |

TABLE 2

| | Ex. 5 | Ex. 6 | Ex. 7 | Ex. 8 | Comp. Ex. 4 | Comp. Ex. 5 | Comp. Ex. 6 | Comp. Ex. 7 |
|---|---|---|---|---|---|---|---|---|
| Zr/Zc | 5.98 | 6.78 | 5.59 | 8.40 | 2.10 | 4.08 | 2.36 | — |
| Image L/L | good | good | good | good | uneven print density | fair | uneven print density | poor print |
| Image N/N | good | good | good | good | uneven print density | fair | uneven print density | good |
| Image H/H | good | good | good | good | uneven print density | fair | uneven print density | fogging |
| Carbon dispersion | good | good | good | good | bad | uneven dispersion | bad | — |

Test Example 4

<Impedance Measurement of Re-Polished Roller>

Figure 11:
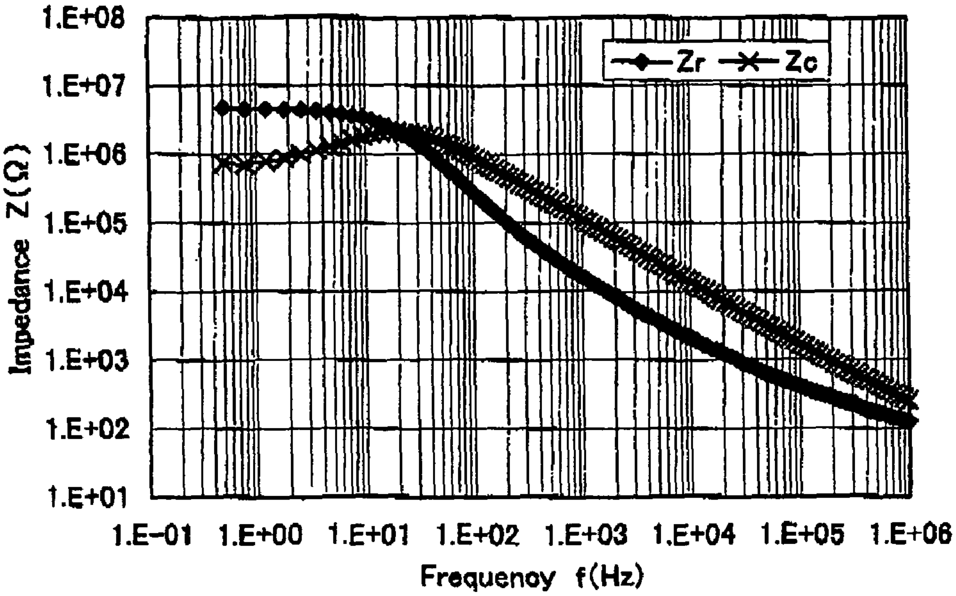
FIG. 11 is a graph showing frequency characteristics of a conductive roller of Example 5 after re-polishing.
Figure 12:
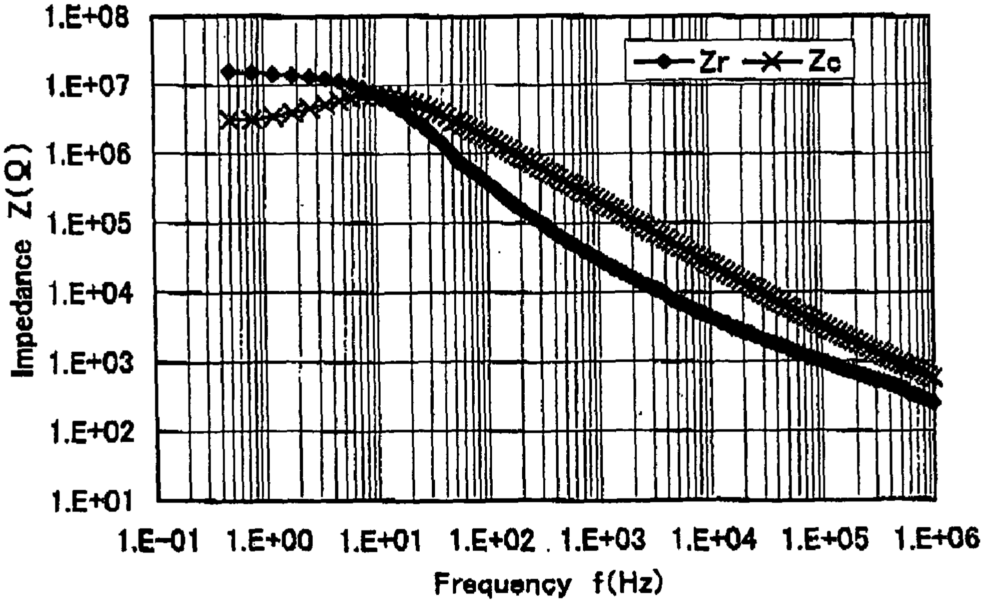
FIG. 12 is a graph showing frequency characteristics of a conductive roller of Comparative Example 4 after re-polishing.
Figure 13:
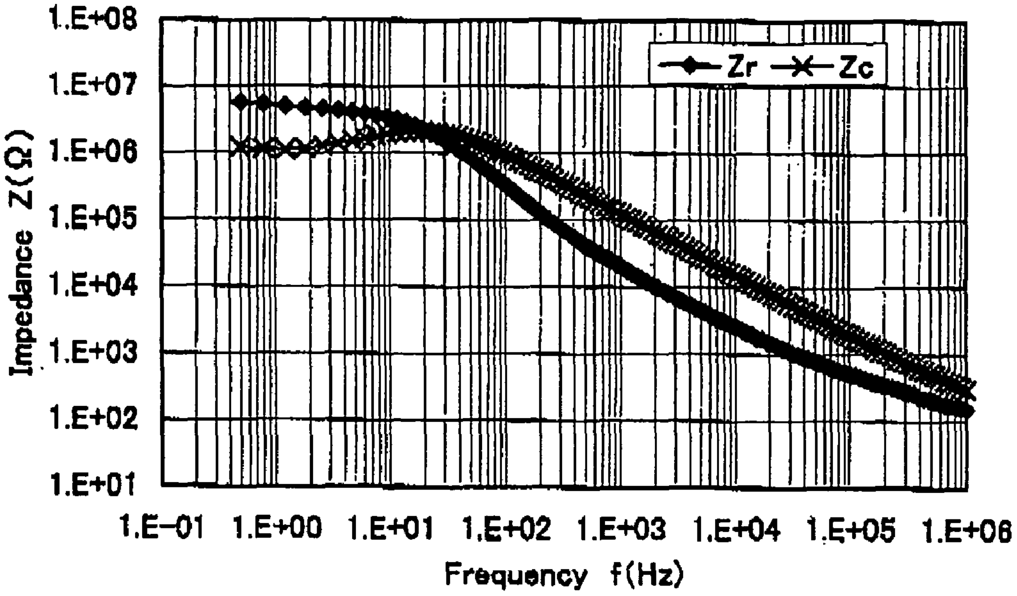
FIG. 13 is a graph showing frequency characteristics of a conductive roller of Comparative Example 5 after re-polishing.

The surface of each of the conductive rollers of Examples 5 to 8 and Comparative Examples 4 to 6 serving as development rollers was polished again in an amount of 0.5 mm, to thereby remove the surface-treated layer, and impedance of the roller was measured in a manner similar to that of Test Example 1, to thereby calculate Zr/Zc. The results are shown in Table 3. FIGS. 11 to 13 show frequency characteristics of the conductive rollers of Example 5 and Comparative Examples 4 and 5.

TABLE 3

| | Ex. 5 | Ex. 6 | Ex. 7 | Ex. 8 | Comp. Ex. 4 | Comp. Ex. 5 | Comp. Ex. 6 |
|---|---|---|---|---|---|---|---|
| Zr/Zc | 5.80 | 5.59 | 5.13 | 5.27 | 4.23 | 4.50 | 4.39 |

Test Example 5

Figure 14:
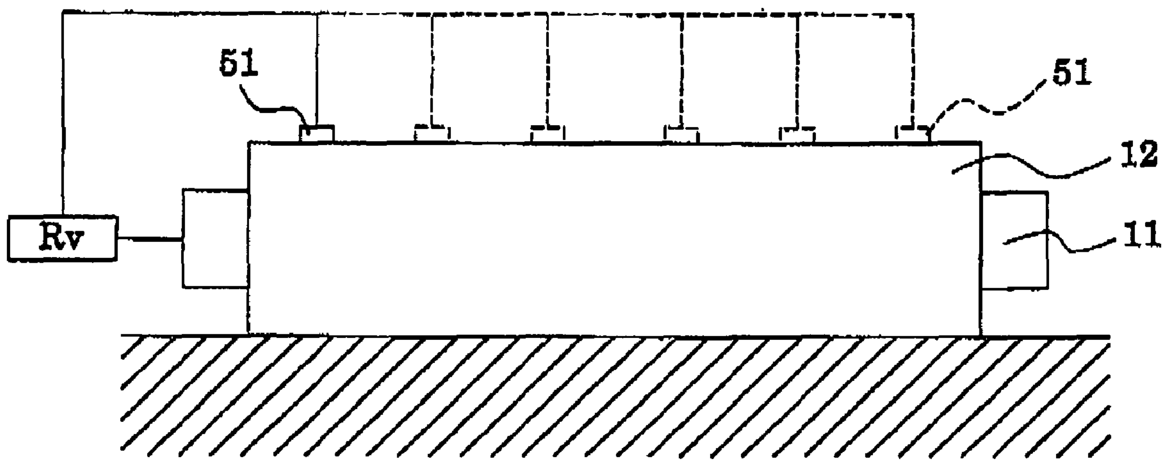
FIG. 14 is a sketch showing a procedure of determining electrical resistance of a conductive roller performed in Test Example 5.
Figure 15:
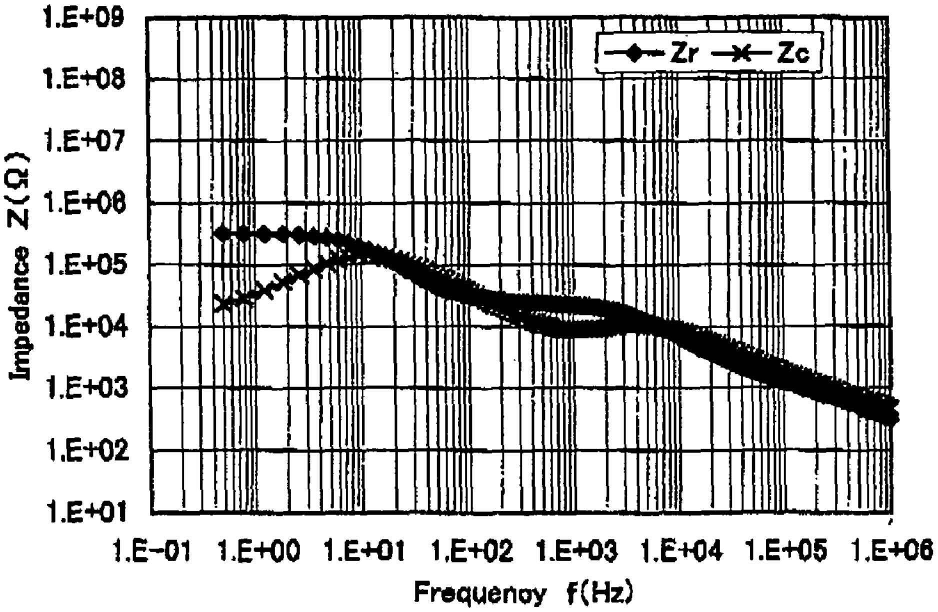
FIG. 15 is a graph showing frequency characteristics obtained in Example 11.
Figure 16:
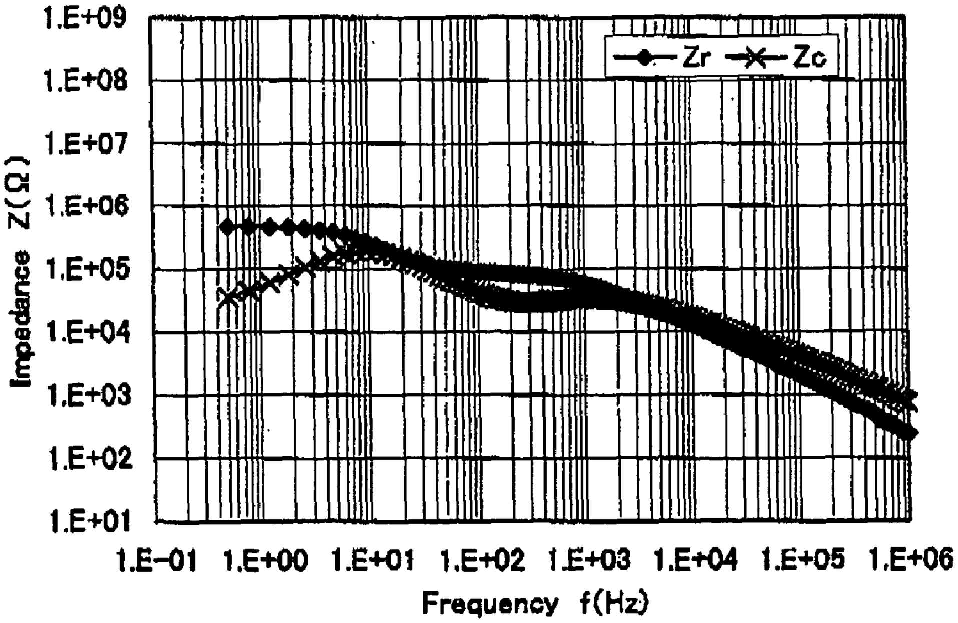
FIG. 16 is a graph showing frequency characteristics obtained in Example 12.
Figure 17:
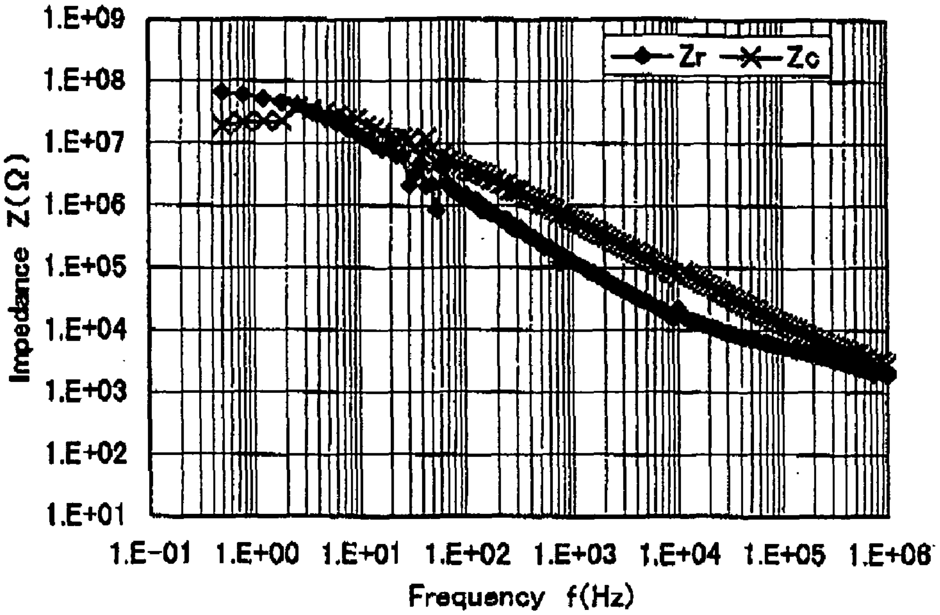
FIG. 17 is a graph showing frequency characteristics obtained in Comparative Example 10.
Figure 18:
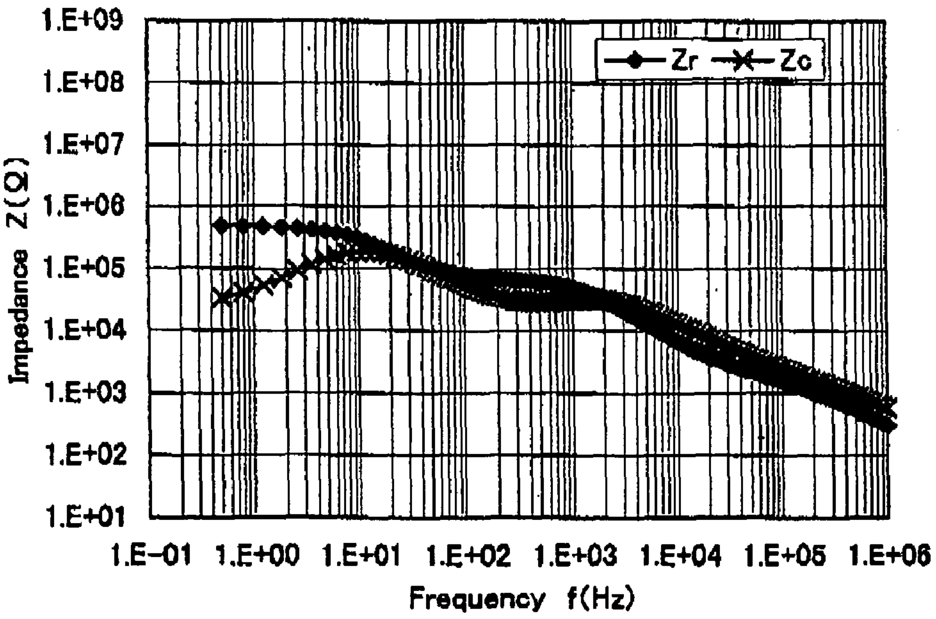
FIG. 18 is a graph showing frequency characteristics obtained in Comparative Example 11.
Figure 19:
FIG. 19 is a photograph captured under a microscope showing a cross-section of a conductive roller of Example 11.
Figure 20:
FIG. 20 is a photograph captured under a microscope showing a cross-section of a conductive roller of Example 12.
Figure 21:
FIG. 21 is a photograph captured under a microscope showing a cross-section of a conductive roller of Comparative Example 10.
Figure 22:
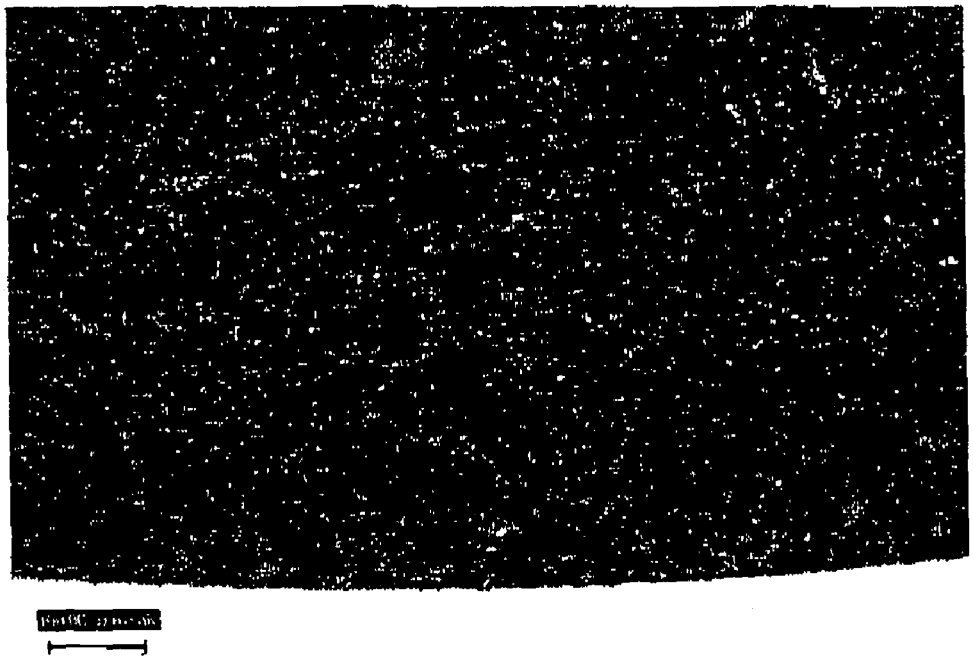
FIG. 22 is a photograph captured under a microscope showing a cross-section of a conductive roller of Comparative Example 11.
Figure 23:
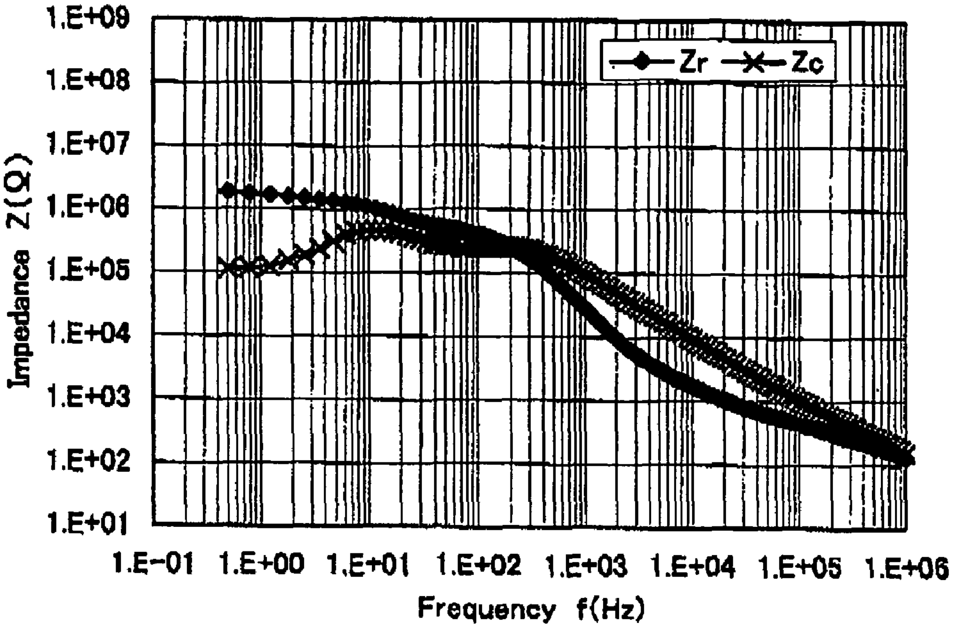
FIG. 23 is a graph showing frequency characteristics of a conductive roller of Example 11 after re-polishing.
Figure 24:
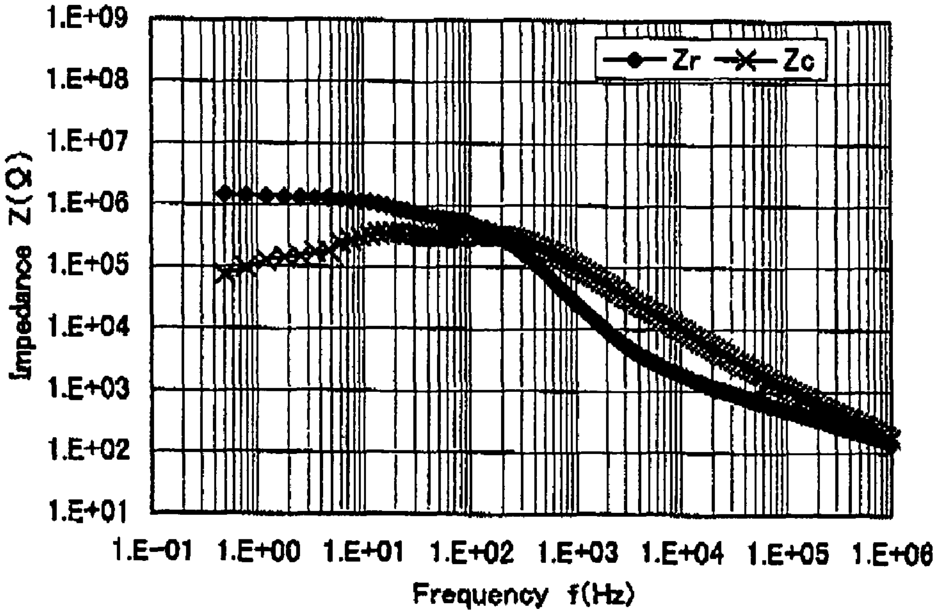
FIG. 24 is a graph showing frequency characteristics of a conductive roller of Example 12 after re-polishing.
Figure 25:
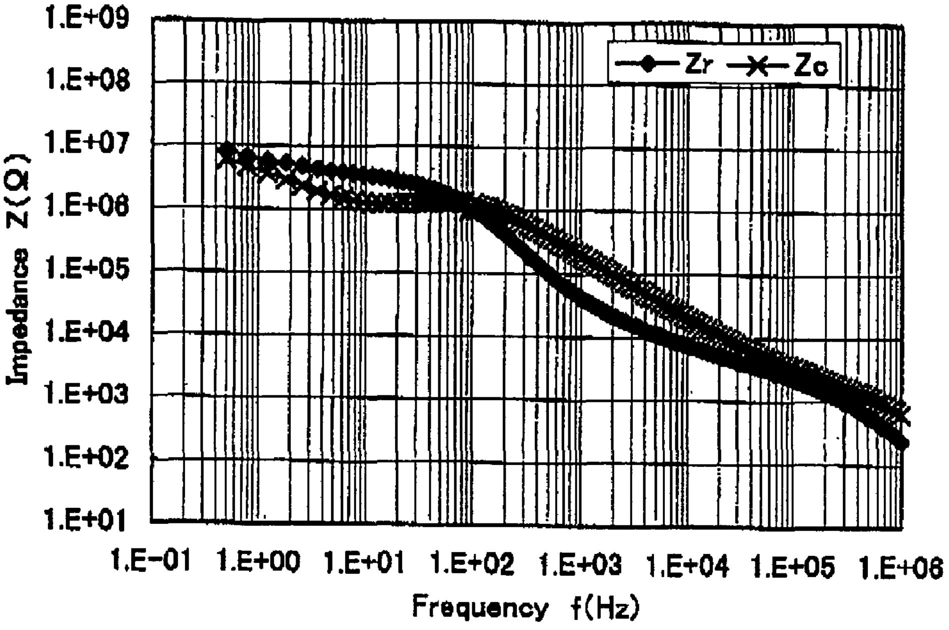
FIG. 25 is a graph showing frequency characteristics of a conductive roller of Comparative Example 10 after re-polishing.
Figure 26:
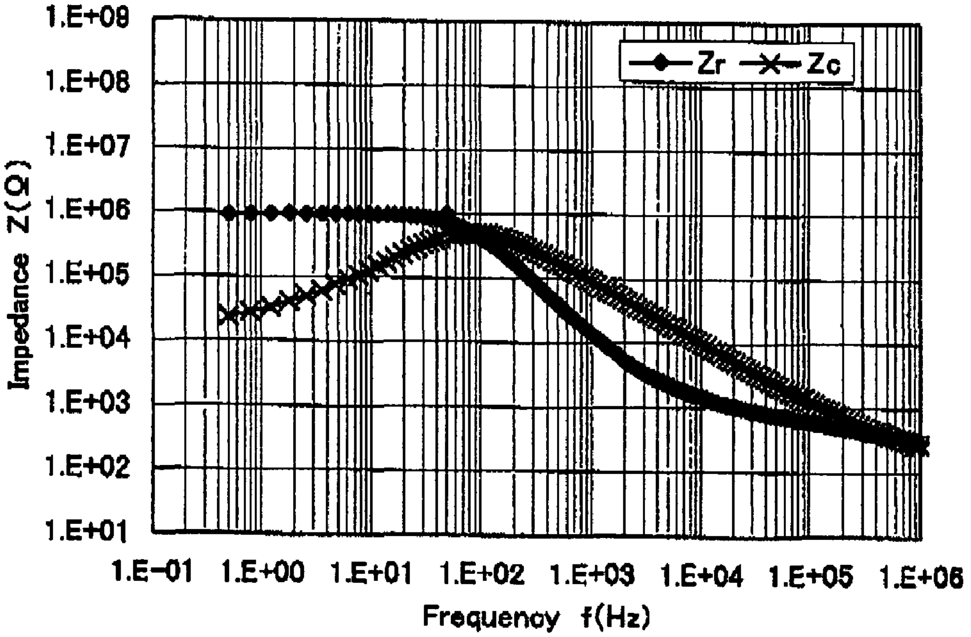
FIG. 26 is a graph showing frequency characteristics of a conductive roller of Comparative Example 11 after re-polishing.

Variation on electrical resistance was evaluated. As shown in FIG. 14, a stainless steel electrode 51 having a width of 2 mm was caused to be contacted with the surface of a rubber elastic layer 12 of a conductive roller, while the roller was rotated about a metallic core 11. The measurement was performed at six different positions in the longitudinal direction. The maximum $R_{max}$ of the mean value and the minimum $R_{min}$ of the mean value were calculated. The results are shown in Table 4.

TABLE 4

| | $R_{max}$ | $R_{min}$ | $R_{max}/R_{min}$ |
|---|---|---|---|
| Ex. 1 | $2.19 \times 10^6$ | $1.08 \times 10^6$ | 2 |
| Ex. 2 | $1.79 \times 10^6$ | $7.82 \times 10^5$ | 2 |
| Ex. 3 | $1.77 \times 10^6$ | $7.51 \times 10^5$ | 2 |
| Ex. 4 | $1.79 \times 10^6$ | $7.61 \times 10^5$ | 2 |
| Ex. 5 | $1.06 \times 10^7$ | $4.35 \times 10^6$ | 2 |
| Ex. 6 | $1.45 \times 10^7$ | $4.24 \times 10^6$ | 3 |
| Ex. 7 | $4.87 \times 10^6$ | $2.06 \times 10^6$ | 2 |
| Ex. 8 | $8.01 \times 10^6$ | $2.37 \times 10^6$ | 3 |
| Comp. Ex. 1 | $2.27 \times 10^6$ | $9.28 \times 10^5$ | 2 |
| Comp. Ex. 2 | $1.71 \times 10^6$ | $7.18 \times 10^5$ | 2 |
| Comp. Ex. 3 | $2.16 \times 10^6$ | $8.72 \times 10^5$ | 2 |
| Comp. Ex. 4 | $6.14 \times 10^7$ | $6.60 \times 10^6$ | 9 |
| Comp. Ex. 5 | $3.11 \times 10^7$ | $4.97 \times 10^6$ | 6 |
| Comp. Ex. 6 | $1.71 \times 10^7$ | $2.02 \times 10^6$ | 8 |

Example 9

The procedure of Example 1 was repeated, except that Toka Black #5500 (product of Tokai Carbon Co., Ltd.) (4 parts) and VULCUN XC (product of Cabot Corp.) (3 parts) were used, and carbon particles were dispersed to a particle size of about 20 μm or less, to thereby produce a conductive roller of Example 9.

Example 10

The procedure of Example 9 was repeated, except that the polypropylene extruded tube was changed to an iron pipe mold which had a release layer formed through a silicone-based releasing agent and which had been preliminary heated at 90° C., to thereby produce a conductive roller of Example 10.

Example 11

The surface of the conductive roller of Example 9 was treated in a manner similar to that of Example 5, to thereby produce a conductive roller of Example 11.

Example 12

The surface of the conductive roller of Example 10 was treated in a manner similar to that of Example 5, to thereby produce a conductive roller of Example 12.

Comparative Example 8

The procedure of Example 9 was repeated, except that a dispersant (BYK-9076, product of Byk Chemie Japan K.K.) (30 wt. %) was added to the carbon powder, and carbon particles were dispersed to a particle size of 10 μm or less, to thereby produce a conductive roller of Comparative Example 8.

Comparative Example 9

The procedure of Example 9 was repeated, except that the heating temperature was altered to 90° C., to thereby produce a conductive roller of Comparative Example 9.

Comparative Example 10

The surface of the conductive roller of Comparative Example 8 was treated in a manner similar to that of Example 5, to thereby produce a conductive roller of Comparative Example 10.

Comparative Example 11

The surface of the conductive roller of Comparative Example 9 was treated in a manner similar to that of Example 5, to thereby produce a conductive roller of Comparative Example 11.

Test Example 6

<Impedance Measurement>

Impedance characteristics of the conductive rollers produced in Examples 9 to 12 and Comparative Examples 8 to 11 were determined by means of an impedance analyzer (IMPEDANCE ANALYZER IM6e, product of BHA). Impedance was measured under N/N conditions (25° C., 50% RH), while a load of 500 g was applied to each end portion of each roller and voltage of 0.2 V was applied to the roller. Resistance component Zr (Ω) was calculated from impedance Z (Ω) and phase difference θ at an AC frequency of 1 Hz, and the ratio (Zr/Zc) of resistance component to capacitive reactance component Zc (Ω) was obtained.

Table 5 shows the results of the rollers of Examples 9 and 10 and Comparative Examples 8 and 9. Table 6 shows the results of the rollers having a surface-treated layer of Examples 11 and 12 and Comparative Examples 10 and 11. FIGS. 15 to 18 show frequency characteristics of the conductive rollers of Examples 11 and 12 and Comparative Examples 10 and 11.

Test Example 7

<Image Evaluation>

Each of the conductive rollers of Examples 11 and 12 and Comparative Examples 10 and 11 was installed as a development roller in a commercial printer. The images obtained under L/L conditions (10° C., 30% RH), N/N conditions (25° C., 50% RH), and H/H conditions (35° C., 85% RH) were evaluated. The results are also shown in Table 6.

Test Example 8

<Microscopic Observation of Cross-Section of Roller>

A cross-section of each of the conductive rollers of Examples 11 and 12 and Comparative Examples 10 and 11 serving as development rollers was observed under a laser microscope (VHX-100, product of KEYENCE), and dispersion of carbon particles was evaluated. The results are also shown in Table 6. FIGS. 19 to 22 are photographs showing cross-sections of conductive rollers of Examples 11 and 12 and Comparative Examples 10 and 11, respectively.

TABLE 5

| | Ex. 9 | Ex. 10 | Comp. Ex. 8 | Comp. Ex. 9 |
|---|---|---|---|---|
| Zr/Zc | 16.21 | 12.03 | 3.66 | 28.49 |

TABLE 6

| | Ex. 11 | Ex. 12 | Comp. Ex. 10 | Comp. Ex. 11 |
|---|---|---|---|---|
| Zr/Zc | 8.24 | 7.78 | 2.30 | 8.76 |
| Image L/L | good | good | Uneven print density | fair |
| Image N/N | good | good | uneven print density | fair |
| Image H/H | good | good | uneven print density | fair |
| Carbon dispersion | good | good | excellent | uneven dispersion |

Test Example 9

<Impedance Measurement of Re-Polished Roller>

The surface of each of the conductive rollers of Examples 11 and 12 and Comparative Examples 10 and 11 serving as development rollers was polished again in an amount of 0.5 mm, to thereby remove the surface-treated layer, and impedance of the roller was measured in a manner similar to that of Test Example 6, to thereby calculate Zr/Zc. The results are shown in Table 7. FIGS. 23 to 26 show frequency characteristics of the conductive rollers of Example 11 and 12 and Comparative Examples 10 and 11.

TABLE 7

| | Ex. 11 | Ex. 12 | Comp. Ex. 10 | Comp. Ex. 11 |
|---|---|---|---|---|
| Zr/Zc | 13.58 | 10.84 | 1.61 | 28.78 |

Test Example 10

Variation on electrical resistance was evaluated. As shown in FIG. 14, a stainless steel electrode 51 having a width of 2 mm was caused to be contacted with the surface of a rubber elastic layer 12 of a conductive roller, while the roller was rotated about a metallic core 11. The measurement was performed at six different positions in the longitudinal direction. The maximum $R_{max}$ of the mean value and the minimum $R_{min}$ of the mean value were calculated. The results are shown in Table 8.

TABLE 8

| | $R_{max}$ | $R_{min}$ | $R_{max}/R_{min}$ |
|---|---|---|---|
| Ex. 9 | $7.10 \times 10^5$ | $4.29 \times 10^5$ | 2 |
| Ex. 10 | $8.11 \times 10^5$ | $4.18 \times 10^5$ | 2 |
| Ex. 11 | $5.26 \times 10^6$ | $9.83 \times 10^5$ | 5 |
| Ex. 12 | $7.21 \times 10^6$ | $1.45 \times 10^6$ | 5 |
| Comp. Ex. 8 | $1.55 \times 10^9$ | $1.00 \times 10^7$ | 155 |
| Comp. Ex. 9 | $7.05 \times 10^5$ | $3.11 \times 10^5$ | 2 |
| Comp. Ex. 10 | $3.65 \times 10^9$ | $2.08 \times 10^8$ | 18 |
| Comp. Ex. 11 | $5.09 \times 10^6$ | $9.10 \times 10^5$ | 6 |

<Test Results>

The above test results indicate the following.

The results of Test Example 1 indicate the following. The conductive rollers of Examples 1 to 4, produced through a production method which attains a favorable carbon powder dispersion state, exhibit a ratio of resistance component Zr (Ω), calculated from impedance Z (Ω) and phase difference θ, to capacitive reactance component Zc (Ω), Zr/Zc, of 5 or higher, whereas the conductive rollers of Comparative Examples 1 to 4, produced through a production method which attains an unfavorable carbon powder dispersion state, exhibit a Zr/Zc lower than 5.

The results of Test Examples 2 to 4 indicate the following. The conductive rollers of Examples 5 to 8, which have been produced through surface treatment of the conductive rollers of Examples 1 to 4, also exhibit a Zr/Zc of 5 or higher. In contrast, the conductive rollers of Comparative Examples 4 to 6, which have been produced through surface treatment of the conductive rollers of Comparative Examples 1 to 3, exhibit a Zr/Zc lower than 5.

The image evaluation results indicate that excellent images can be obtained under tested conditions, when any of the conductive rollers of Examples 5 to 8, exhibiting a Zr/Zc higher than 5, is employed. In these cases, a favorable carbon dispersion state, as confirmed by a microscopic photograph, can be provided. In contrast, when any of the conductive rollers of Comparative Examples 4 to 6, exhibiting a Zr/Zc lower than 5, is employed, the obtained image quality is poor, and the carbon dispersion state includes unevenness. The conductive roller of Comparative Example 7, containing an ion conducting agent, provides an image of problematic quality.

The conductive rollers of Examples 5 to 8, which have been surface-treated, were also found to exhibit a Zr/Zc of 5 or higher, after removal of the surface-treated layer through polishing.

Variations in electrical resistance of the conductive rollers of Examples 1 to 8 and Comparative Examples of 1 to 6 were found to occur, independent of the dispersion state of carbon particles. Therefore, a conductive roller which exhibits a favorable carbon dispersion state and provides high-quality images cannot be completely selected on the basis of variation in electrical resistance, but can be absolutely selected on the basis Zr/Zc.

In Example 9, the amount of carbon was increased, and the particle size of carbon was controlled to 20 μm or less. In this case, dispersibility of carbon particles was lower as compared with Examples 1 to 4. However, since the conductive roller was produced through a production method which attains a favorable carbon powder dispersion state, a Zr/Zc of 5 or higher was obtained. In fact, the Zr/Zc was found to be 10 or higher, since the resistance component presumably increased, as compared with Examples 1 to 4.

In Example 10, the conductive roller was produced through a production method which attains an unfavorable carbon powder dispersion state. However, since the molding temperature was low (90° C.), presumably due to suppressed aggregation of carbon particles in a portion in the vicinity of the mold surface, Zr/Zc was found to be 5 or higher.

In Comparative Example 8, carbon particles were sufficiently dispersed by use of a dispersant, thereby attaining a highly dispersed state. In this case, Zr/Zc was found to be lower than 5, since, presumably, carbon network conductive paths were not sufficiently formed. In Comparative Example 9, the conductive roller was produced at a molding temperature of 90° C. and through a production method which attains a favorable carbon powder dispersion state. In this case, Zr/Zc was found to higher than 25, since re-aggregation of carbon particles was presumably promoted due to slow urethane curing reaction.

The image evaluation results indicate that excellent images can be obtained under tested conditions, when any of the conductive rollers of Examples 11 and 12, exhibiting a Zr/Zc higher than 5, is employed. In these cases, a favorable carbon dispersion state, as confirmed by a microscopic photograph, can be provided. In contrast, when the conductive roller of Comparative Example 10, exhibiting a Zr/Zc lower than 5, is employed, variation in print density was found in image evaluation, although an excellent carbon dispersion state can be attained.

When the conductive roller of Comparative Example 11, exhibiting a Zr/Zc of the rubber elastic layer higher than 25, is employed, the carbon dispersion state assumes unevenness in dispersion caused by re-aggregation of carbon particles, as confirmed by a microscopic photograph, although fair images can be obtained in the tested conditions.

The conductive rollers of Examples 11 and 12, which have been surface-treated, were also found to exhibit a Zr/Zc of 5 or higher, after removal of the surface-treated layer through polishing.

Variations in electrical resistance of the conductive rollers of Examples 9 to 12 and Comparative Examples of 8 to 11 were found to occur, independent of the dispersion state of carbon particles. Therefore, a conductive roller which exhibits a favorable carbon dispersion state and provides high-quality images cannot be completely selected on the basis of variation in electrical resistance, but can be absolutely selected on the basis of Zr/Zc.

As described hereinabove, the present invention provides a conductive roller which has a relationship between resistance component Zr (Ω), calculated from impedance Z (Ω) and phase difference θ, and capacitive reactance Zc (Ω), as measured upon application of an AC voltage of 0.2 V at a frequency of 1 Hz, falling within a predetermined range. When used as, for example, a development roller, such a conductive roller exhibits remarkably consistent performance and small environmental dependency.

What is claimed is:

1. A conductive roller comprising a metallic core and at least one rubber elastic layer provided on the outer peripheral surface of the core, the rubber elastic layer being formed from a conductive rubber to which conductivity has been imparted by carbon powder, wherein the conductive roller satisfies the relationship represented by formula (1):

$$Zr/Zc \geqq 5 \quad (1),$$

wherein Zr (Ω) represents a resistance component and Zc (Ω) represents a capacitive reactance component, the resistance component Zr (Ω) and the capacitive resistance Zc (Ω) being calculated respectively from impedance Z (Ω) and phase difference θ, when the impedance Z (Ω) is measured upon application of an AC voltage of 0.2 V at a frequency of 1 Hz to the rubber elastic layer.

2. A conductive roller according to claim 1, wherein the relationship between resistance component Zr (Ω) and capacitive reactance Zc (Ω) satisfies formula (1), when the impedance Z (Ω) is measured upon application of an AC voltage of 0.2 V at a frequency of 1 Hz to the rubber elastic layer and under any of L/L conditions (10° C., 30% RH), N/N conditions (25° C., 50% RH), and H/H conditions (35° C., 85% RH).

3. A conductive roller according to claim 1, wherein the rubber elastic layer is formed of a polyurethane rubber having conductivity, and the polyurethane is an ether-based polyurethane.

4. A conductive roller according to claim 3, wherein the rubber elastic layer has, on a surface thereof, a surface-treated layer which has been formed through treating the surface with a surface-treatment liquid containing an isocyanate, and, the relationship between resistance component Zr (Ω) and capacitive reactance Zc (Ω) satisfies formula (2):

$$25 \geqq Zr/Zc \geqq 5 \quad (2),$$

when the impedance Z (Ω) is measured upon application of an AC voltage of 0.2 V at a frequency of 1 Hz to the rubber elastic layer after removal of the surface-treated layer.

5. A conductive roller according to claim 4, wherein the relationship between resistance component Zr (Ω) and capacitive reactance Zc (Ω) satisfies formula (2) when the impedance Z (Ω) is measured upon application of an AC voltage of 0.2 V at a frequency of 1 Hz to the rubber elastic layer having the surface-treated layer.

6. A conductive roller according to claim 5, wherein the surface treatment liquid further contains carbon black, and/or at least one polymer species selected from among an acrylic fluoropolymer and an acrylic silicone polymer.

7. A conductive roller according to claim 4, wherein the surface treatment liquid further contains carbon black, and/or at least one polymer species selected from among an acrylic fluoropolymer and an acrylic silicone polymer.

8. A method for inspecting a conductive roller having a metallic core and at least one rubber elastic layer provided on the outer peripheral surface of the core, the rubber elastic layer being formed from a conductive rubber to which conductivity has been imparted by carbon powder, wherein the method comprises determining whether or not the relationship between resistance component Zr (Ω) and capacitive reactance Zc (Ω), the resistance component Zr (Ω) and the capacitive reactance Zc (Ω) being calculated respectively from impedance Z (Ω) and phase difference θ satisfies formula (1):

$$Zr/Zc \geqq 5 \quad (1),$$

when the impedance Z (Ω)is measured upon application of an AC voltage of 0.2 V at a frequency of 1 Hz to the rubber elastic layer.

9. A method for inspecting a conductive roller according to claim 8, wherein the method comprises determining whether or not the relationship between resistance component Zr (Ω) and capacitive reactance Zc (Ω) satisfies formula (1), when the impedance Z (Ω) is measured upon application of an AC voltage of 0.2 V at a frequency of 1 Hz and under any of L/L conditions (10° C., 30% RH), N/N conditions (25° C., 50% RH), and H/H conditions (35° C., 85% RH), to the rubber elastic layer.

10. A method for inspecting a conductive roller according to claim 8, wherein the rubber elastic layer is formed of a polyurethane rubber having conductivity and formed of an ether-based polyurethane, and has, on a surface thereof, a surface-treated layer which has been formed through treating the surface with a surface-treatment liquid containing an isocyanate, and, the method comprises determining whether or not the relationship between resistance component Zr (Ω) and capacitive reactance Zc (Ω) satisfies formula (2):

$$25 \geqq Zr/Zc \geqq 5 \quad (2),$$

when the impedance Z (Ω) is measured upon application of an AC voltage of 0.2 V at a frequency of 1 Hz to the rubber elastic layer after removal of the surface-treated layer.

11. A method for inspecting a conductive roller according to claim 10, wherein the method comprises determining whether or not the relationship between resistance component Zr (Ω) and capacitive reactance Zc (Ω) satisfies formula (2), when the impedance Z (Ω) is measured upon application of an AC voltage of 0.2 V at a frequency of 1 Hz to the rubber elastic layer having the surface-treated layer.

12. A method for inspecting a conductive roller according to claim 11, wherein the surface treatment liquid further contains carbon black, and/or at least one polymer species selected from among an acrylic fluoropolymer and an acrylic silicone polymer.

13. A method for inspecting a conductive roller according to claim 10, wherein the surface treatment liquid further contains carbon black, and/or at least one polymer species selected from among an acrylic fluoropolymer and an acrylic silicone polymer.

* * * * *